Aug. 5, 1969 D. E. GRIFFEY 3,459,992

BLANKING CIRCUIT

Filed Aug. 18, 1967

Inventor
DONALD E. GRIFFEY

BY Mueller, Aichele & Rauner

ATTYS.

United States Patent Office 3,459,992
Patented Aug. 5, 1969

3,459,992

BLANKING CIRCUIT

Donald E. Griffey, Skokie, Ill., assignor to Motorola, Inc., Franklin Park, Ill., a corporation of Illinois Filed Aug. 18, 1967, Ser. No. 661,597
Int. Cl. H01j *29/70*
U.S. Cl. 315—22 7 Claims

ABSTRACT OF THE DISCLOSURE

The circuit applies flyback pulses from the vertical and horizontal sweep systems to the cathode ray tube in a television receiver. The pulses are poled to render the cathode ray tube non-conductive during retrace intervals. Undesirable ripple components occurring between horizontal pulses are shunted away from the cathode ray tube by means of a diode coupled between the tube and ground reference potential.

BACKGROUND OF THE INVENTION

A television receiver commonly employs horizontal and vertical sweep systems to deflect the electron beam produced in a cathode ray tube across its screen. After each active line sweep, the horizontal deflection signal causes the beams to return to the left-hand side of the screen in preparation to scan the next line. Similarly, after each active field sweep the vertical deflection signal causes the beam to return to the top of the screen. During these return movements or retrace intervals a blanking pulse is transmitted the amplitude of which is in the blacker than black region of the video signal to extinguish the cathode ray beam. However, these blanking pulses alone may not be sufficient to provide complete beam suppression where, for example, a maximum brightness, minimum contrast condition is present. Incomplete blanking causes the return movements to be visible on the screen so that undesirable black zones may appear.

To prevent this, blanking circuits are utilized which are responsive to signals from the sweep systems to produce blanking pulses of sufficient magnitude and duration to insure complete suppression of the cathode ray beam during retrace. However, a ripple component which occurs between successive horizontal blanking pulses also appears on the grid of the cathode ray tube to undesirably modulate the video signal and thereby produce incorrect shading of the reproduced image.

SUMMARY OF THE INVENTION

It is, therefore, an object of this invention to provide a blanking circuit which effectively suppresses the cathode ray beam during horizontal retrace but does not modulate the video signal during trace.

Another object is to permit coupling horizontal and vertical retrace blanking pulses to the same electrode of the cathode ray tube without modulating the video signal.

In practicing a preferred form of the invention, a circuit is coupled to the horizontal sweep system to provide a pulsating signal with pulses of a given polarity recurring at a horizontal sweep frequency during the horizontal retrace intervals. The pulsating signal also has a ripple component of an opposite polarity recurring during the trace interval. A further circuit couples the pulses to a conduction control electrode of the cathode ray tube with a polarity to render the tube non-conductive during the retrace intervals. In order to preclude the ripple component from being applied to the cathode ray tube to modulate the video signal, a diode is coupled between the further circuit and ground reference potential and poled to shunt the ripple component to ground. Vertical blanking pulses from the vertical sweep system are coupled to the same conduction control electrode and are poled to render the cathode ray tube non-conductive during the vertical retrace intervals.

DETAILED DESCRIPTION OF THE PREFERRED EMBODIMENT

Figure 1:
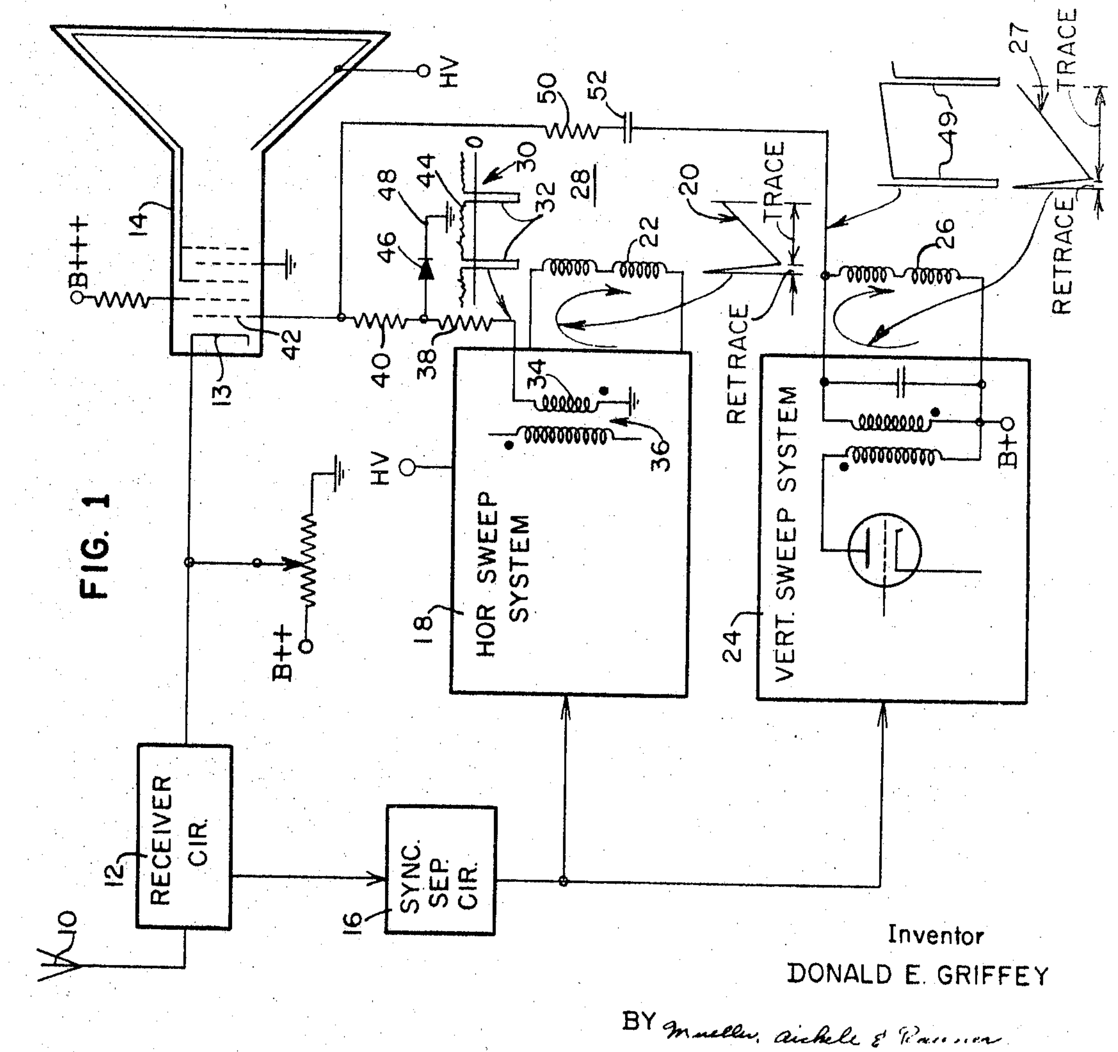
FIG. 1 is a diagram partially schematic and partially in block of a television receiver incorporating the blanking circuit according to the invention.

Referring now to the television receiver of FIG. 1, a television signal received by antenna 10 is processed in a known manner by receiver circuit 12 to produce video information to be applied to the cathode 13 of a cathode ray tube 14. Horizontal synchronizing signals are separated from the video information in a synchronizing signal separator circuit 16, and are coupled to a horizontal sweep and high voltage system 18 to cause a sawtooth current 20 to flow in the horizontal deflection winding 22 located on the neck of the cathode ray tube 14. Such current has a trace portion to horizontally sweep the electron beams across the screen of the cathode ray tube 14 for depicting the video information. Signal 20 also has a retrace portion to rapidly return the beams to the left-hand side of the raster. Vertical synchronizing signals are separated from the video information in synchronizing signal separator circuit 16 and are coupled to a vertical sweep system 24 for generating in the vertical deflection winding 26 a sawtooth current 27 also having trace and retrace intervals. Although not apparent from the drawing, the frequency of current 20 is 15,750 Hz. while the frequency of current 27 is 60 Hz.

In order to insure complete suppression of the cathode ray beam during the retrace intervals, the blanking circuit 28 is employed. A pulsating signal 30 having pulses 32 occurring during the horizontal retrace intervals appear across the secondary winding 34 of a transformer 36 in the horizontal sweep system 18. The signal 30 is coupled through a pair of resistors 38 and 40 to the control grid 42 of the cathode ray tube 14. The polarity of the transformer 36 is selected to provide properly poled pulses to cut the cathode ray tube 14 off, in this case, the pulses 32 are negative and when applied to the grid 42 will serve to render the cathode ray tube 14 nonconductive. The video information from receiver circuit 12 is applied to the cathode 13 to control the electron beam intensity according to the makeup of the video signal. Since this video information occurs during the horizontal trace intervals, any voltage on the grid 42 occurring during the trace intervals will be reflected as a modulation of the beam intensity, or in other words, an undesirable shading of the reproduced image. It will be noted that the pulsating signal 30 includes a ripple component 44 occurring during the trace intervals which if not removed will be present on the control grid 42 to cause such undesirable modulation. This component arises due to the fact that the horizontal sweep system 18 has resonant circuits which are rung to form at least part of the sawtooth current 20. This also creates, however, higher frequency oscillation appearing as the ripple component 44.

In order to preclude this, the blanking circuit 28 includes a unilateral semiconductor device or diode 46 coupled between the junction of resistors 38 and 40 to a point of reference potential, here ground. It will be noted that the ripple component 44 is of a positive polarity and the pulses 32 are of a negative polarity. The diode 46 is poled to conduct only on the positive-going ripple component 44 and to shunt the same to ground so as to preclude the ripple component from being applied to the grid 42. Since diode 46 will present a high impedance to the pulses 32, they will be applied to the grid 42 to render the cathode ray tube 14 non-conductive during the horizontal retrace intervals. Thus by removing just the ripple component occurring during the trace interval, the undesirable modulation of the cathode ray electron beam is significantly reduced with no deleterious effect on blanking.

Voltage pulses 49 recurring at the vertical sweep frequency and occurring during vertical retrace intervals are coupled through a series resistor 50 and capacitor 52 to the control grid 42 of the cathode ray tube 14 to effect blanking of the electron beam during the vertical retrace intervals also.

Figure 2:
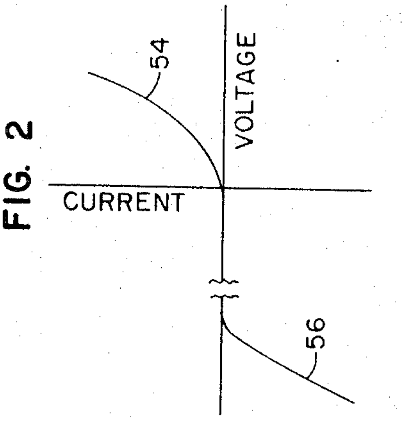
FIG. 2 is a graph of the voltage-current characteristic of a germanium diode.

Preferably the diode 46 should have a germanium composition. The reason for this may be seen by referring to FIG. 2 which illustrates the voltage-current characteristic of a germanium diode. Region 54 represents the forward bias or low impedance condition of the diode to shunt the ripple component 44 of the pulsating signal 30 to ground. Region 56 indicates the reverse bias condition of the germanium diode. As can be seen, the knee of region 56 where the diode breaks down, is rounded. If the bend in the knee would be on the order of 90°, the pulses 32 which have a sufficiently negative amplitude to drive the diode into such region would create undersirable harmonics to radiate into other parts of the receiver. A silicon diode would have a much sharper knee and therefore more susceptible to creating such harmonics. If a silicon diode was chosen, its peak inverse voltage (PIV) rating would have to be substantially higher so that the pulses 32 would not be of suffiicient amplitude to drive the diode into this breakdown or avalanche region.

I claim:

1. In a television receiver having a cathode ray tube with a conduction control electrode, horizontal and vertical deflection windings for respectively horizontally and vertically deflecting an electron beam in the cathode ray tube, horizontal and vertical sweep systems for respectively energizing the deflection windings with horizontal and vertical sawtooth current signals each having trace and retrace intervals, a blanking circuit for the cathode ray tube including in combination: first circuit means coupled to the horizontal sweep system for providing a pulsating signal with pulses of a given polarity recurring during the horizontal retrace intervals and with a ripple component of opposite polarity recurring during the trace interval, second passive circuit means directly coupling the pulses from the first circuit means to the conduction control electrode of the cathode ray tube, the polarity of the pulses selected with reference to the conduction control electrode to render the cathode ray tube non-conductive during the horizontal retrace intervals, unidirectional semiconductor means coupled between said second circuit means and a reference potential and poled with respect to said opposite polarity to shunt said ripple component away from the cathode ray tube.

2. The television receiver set forth in claim 1 wherein said blanking circuit further includes third circuit means coupled between the vertical sweep system and the conduction control electrode of the cathode ray tube for providing pulses recurring during the vertical retrace intervals and of a polarity to render the cathode ray tube nonconductive during such vertical retrace intervals.

3. The television receiver set forth in claim 2 wherein said second circuit means includes a pair of resistors coupled in series between said first circuit means and said conduction control electrode, wherein said unidirectional semiconductor means comprises a diode coupled between the junction of said resistors and ground reference potential, and wherein said third circuit means comprises capacitor means and resistor means coupled in series between the vertical sweep system and the conduction control electrode of the cathode ray tube.

4. The television receiver set forth in claim 1 wherein said conduction control electrode of said cathode ray tube comprises a grid electrode, wherein said first circuit means comprises a transformer poled to provide a pulsating signal with negative polarity pulses and a positive polarity ripple component, wherein said second circuit means comprises a pair of resistors coupled between said transformer and said grid electrode, wherein said unidirectional semiconductor means comprises a diode having an anode and a cathode, with said anode coupled to the junction of said pair of resistors and with said cathode coupled to ground reference potential.

5. The television receiver set forth in claim 4 wherein said diode has a germanium composition with a peak inverse rating which may be exceeded by said negative polarity pulses.

6. In a television receiver having a cathode ray tube with a conduction control electrode, a deflection winding for respectively deflecting an electron beam in the cathode ray tube, a sweep system for energizing the deflection winding with current signals having trace and retrace intervals, a blanking circuit for the cathode ray tube including in combination: first circuit means coupled to the sweep system for providing a pulsating signal, with pulses of a given polarity recurring during the retrace intervals and with a component of opposite polarity recurring during the trace interval, second circuit means coupling the pulses to the conduction control electrode of the cathode ray tube, the polarity of the pulses selected with reference to the conduction control electrode rendering the cathode ray tube non-conductive during the retrace intervals, unidirectional germanium semiconductor means coupled between said second circuit means and a reference potential and poled with respect to said given polarity component for blocking conduction of said given polarity component but wherein said given polarity component may have a magnitude which exceeds the peak inverse voltage rating of said germanium semiconductor means, causing breakdown of the semiconductor means.

7. The combination according to claim 6 wherein the signal component of opposite polarity includes a ripple component and wherein said unidirectional germanium semiconductor means is poled with respect to said opposite polarity component to shunt said ripple component away from the cathode ray tube.

References Cited

UNITED STATES PATENTS 3,378,719 4/1968 Cummings __________ 315—22

RODNEY D. BENNETT, Jr., Primary Examiner

T. H. TUBBESING, Assistant Examiner